July 1, 1924.

H. F. SCHMIDT

Re. 15,870

TRACTOR

Original Filed Jan. 29, 1918 4 Sheets-Sheet 1

Inventor

H. F. Schmidt

By

Attorney

July 1, 1924. H. F. SCHMIDT Re. 15,870

TRACTOR

Original Filed Jan. 29, 1918 4 Sheets-Sheet 2

Inventor

H. F. Schmidt

By

G. P. Dillon

Attorney

July 1, 1924. Re. 15,870
H. F. SCHMIDT
TRACTOR
Original Filed Jan. 29, 1918 4 Sheets-Sheet 3
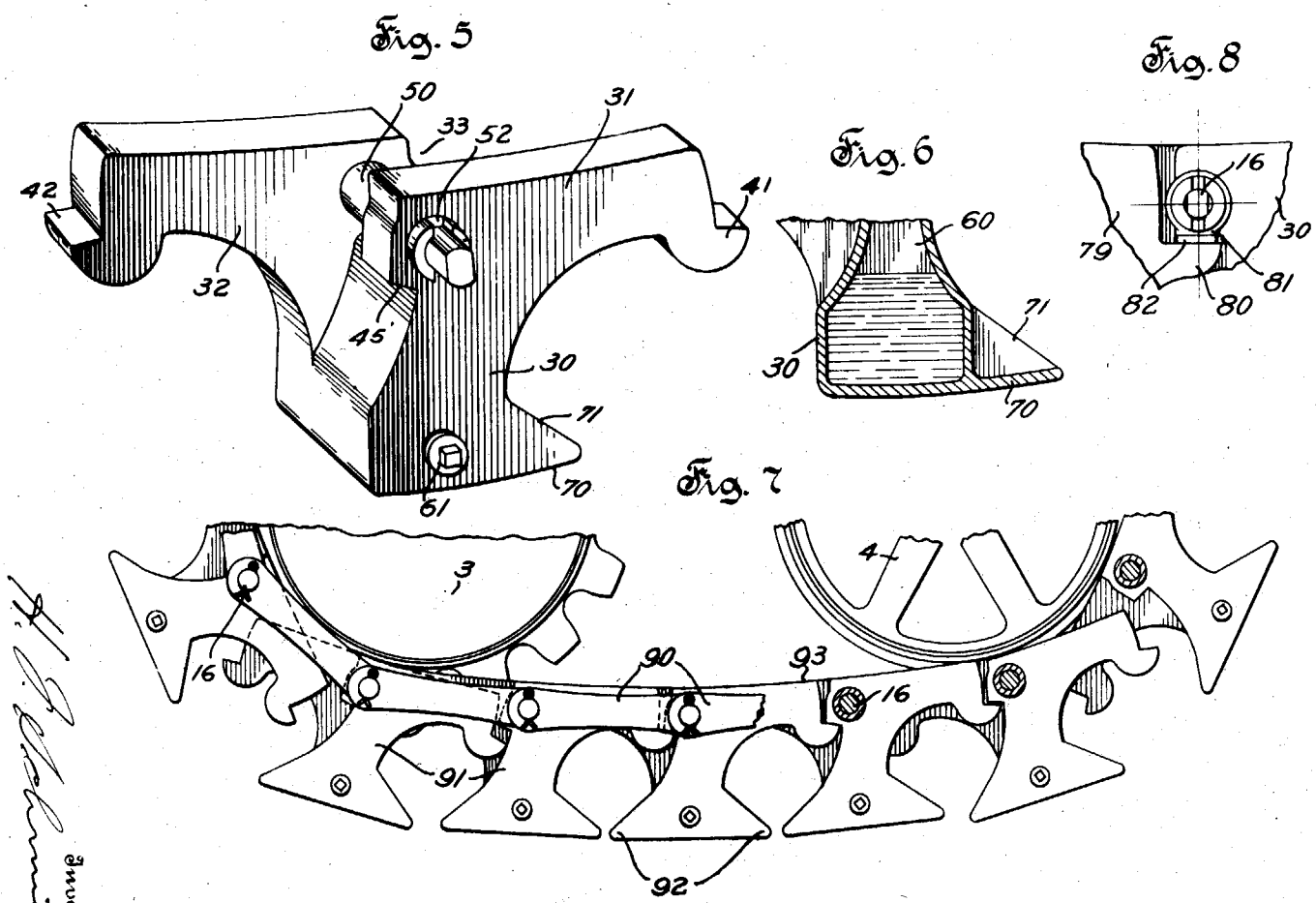
Inventor
H. F. Schmidt
By
Attorney July 1, 1924. Re. 15,870

H. F. SCHMIDT

TRACTOR

Original Filed Jan. 29, 1918 4 Sheets-Sheet 4

Inventor

H. F. Schmidt

By

Attorney

Reissued July 1, 1924. Re. 15,870

UNITED STATES PATENT OFFICE.

HUGO F. SCHMIDT, OF MILWAUKEE, WISCONSIN.

TRACTOR.

Original No. 1,356,743, dated October 26, 1920, Serial No. 214,413, filed January 29, 1918. Application for reissue filed December 2, 1921. Serial No. 519,517.

*To all whom it may concern:*

Be it known that I, HUGO F. SCHMIDT, a citizen of the United States, residing in Milwaukee, Milwaukee County, Wisconsin, have invented new and useful Improvements in Tractors, of which the following is a specification.

This invention relates to improvements in tractors, and more especially to a linked track or drive chain included in the mechanism of a tractor. In the general type of drive chains embodied in a tractor machine of ordinary form there is a pair of endless linked tracks or linked belts, each of which is directed about two wheels spaced apart to provide a relatively flat or horizontal section of the track carrying the weight of the machine on the ground; and in order to stiffen this section of the track and prevent it from bending up between the two wheels, the common expedient is to support the weight of the machine on this part of the chain through a series of rollers or wheels. This necessarily produces a heavy and clumsy mechanism, requiring linked tracks or chains of considerable length and width to properly distribute the weight of the mechanism when the machine is traveling on soft ground, and as the strengthening and stiffening of the machine must in general be in proportion to its length, the result is usually that the tractor machine becomes a huge and ponderous affair, which is expensive to build and operate and difficult to keep in order and repair. In order to overcome some of these defects and disadvantages, I have shown in my Patent No. 1,300,029, dated Apr. 8, 1919, a form of linked track or drive chain designed to include inherent means for stiffening or trussing the lower section of track length which travels on the ground, so as to form an inverted arch carrying the weight of the machine through a pair of wheels around which the chain or track is directed. One of the objects of this invention is to provide further improvements in the general type of drive chain or linked track shown in the said application, a linked track or chain embodying the present improvements, being shown in the accompanying drawings, in which:

Fig. 5 is a view in perspective showing one of the rail pieces or shoes which is used in combination with the chain links to stiffen the latter and carry the load.

Fig. 6 is a radial section through the rail piece shown in Fig. 5.

Fig. 7 is a view partly in side elevation and partly in radial section showing a modified form of the chain.

Fig. 8 is a view showing fragmentary portions of two rail pieces of modified form.

Figure 1:
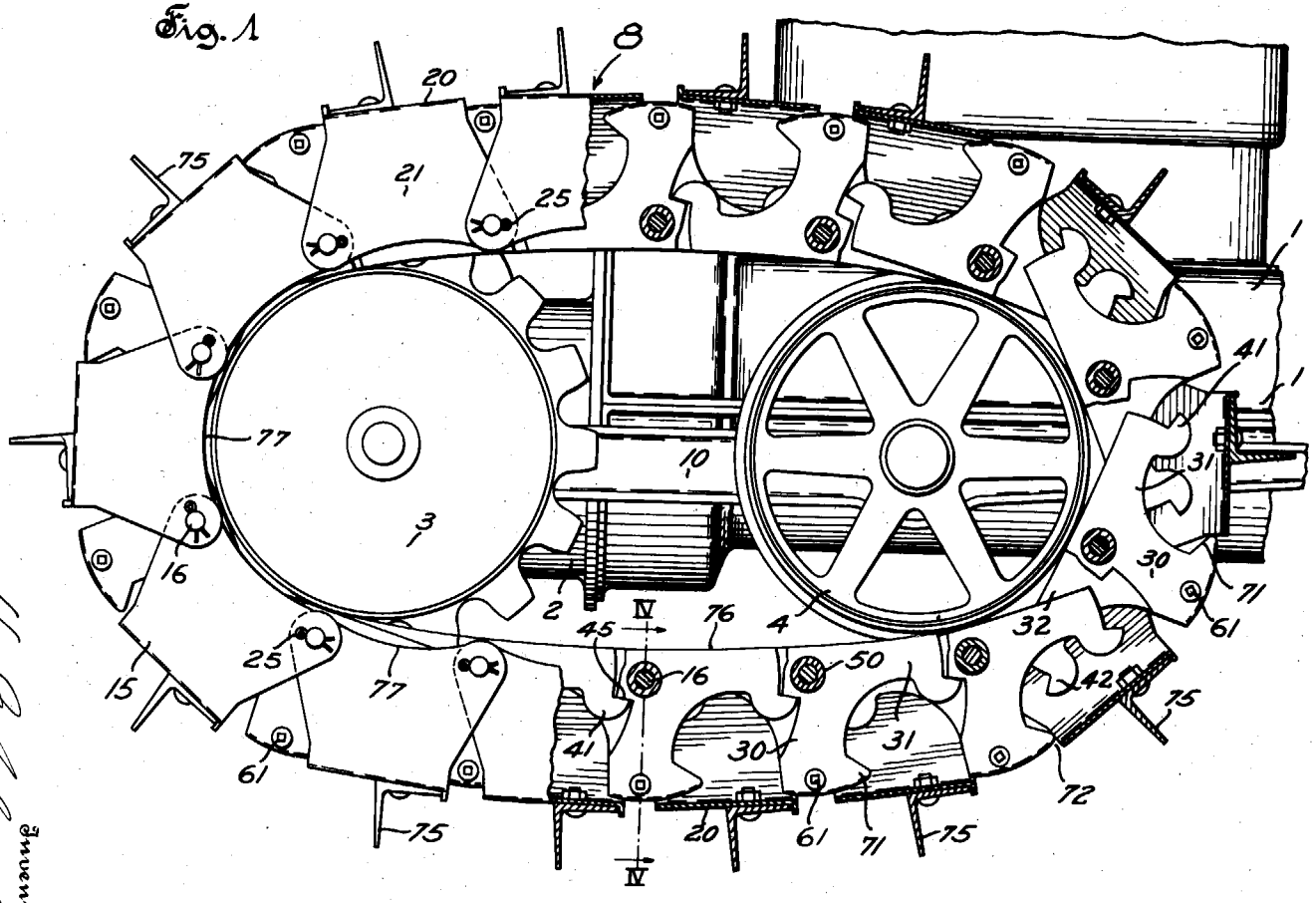
Figure 1 is a view of the complete drive chain in side elevation, with some of the links shown in radial section.
Figure 2:
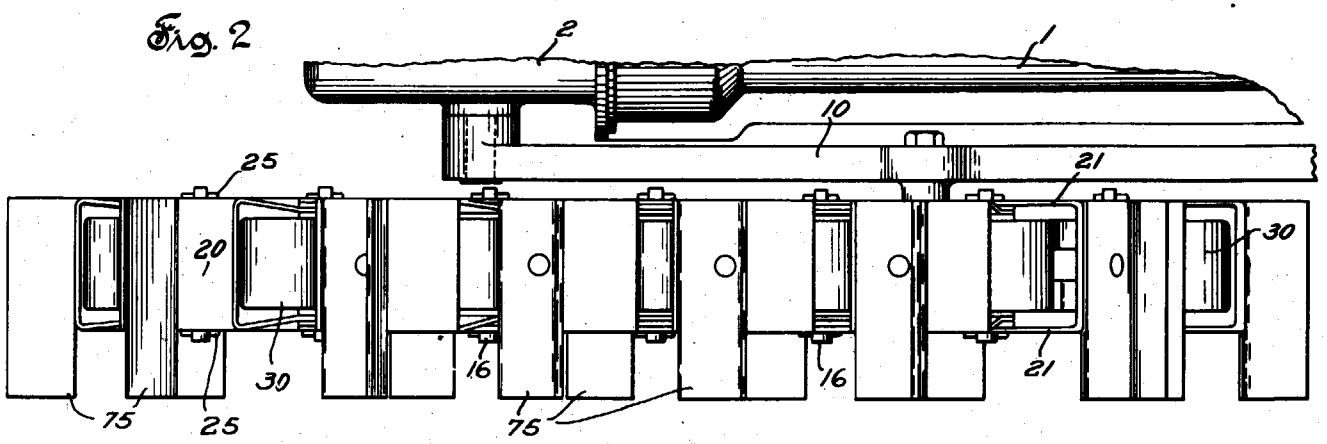
Fig. 2 is a view showing the complete chain in top plan.

As shown in said drawings in Figs. 1 to 6 inclusive, the complete tractor machine is made with a unitary frame structure comprising an engine 1 and a transmission gear-set housing 2, which are bolted together and supported on each side through a sprocket wheel 3 and an idler wheel 4 in an endless linked track or belt 8 which is directed about them. The sprocket wheel 3 is driven through suitable mechanism in the transmission gear housing 2 and the weight of the machine is carried on the wheel 4 by a beam or bar 10, one end of which is pivotally connected to the housing 2 and the other end of which is shackled to a spring (not shown) supporting the forward end of the engine frame 1.

The continuous or endless linked track or chain 8 is formed of a number of links 15, all of them alike, which are articulated together by means of pivot pins 16. Each link 15, which may preferably be made of a plate of uniform thickness, cut and bent to the desired shape, comprises an integral flat tread part 20 (see Fig. 4) with a pair of vertical side walls 21. The side walls are trapezoidal in form, being wider at their inner edges (or those edges which are adjacent to the wheels 3 and 4) and at their outer edges. The two walls are also narrowed together at one end of each link so that the latter may telescope into the space between the two walls of the next succeeding link, thus permitting all the links to be hinged or pivoted together by the bolts or pins 16; which latter are secured in place by split pins 25.

Within the box-like structure formed by the tread plate 20 and the two side walls 21 of each link, is placed one of the rail pieces shown in Fig. 5, each of these being shaped somewhat like the letter T and comprising a radially extending, center part 30 with integral, tangentially projecting feet (31 and 32). The two feet (31 and 32) overlap at their adjacent ends and are staggered or offset in relation to each other so as to leave a cleft 33 between them, and so that each foot may overlap the foot which extends toward it from the next adjacent link. The block or piece 30 is pivotally mounted on the pin 16, which latter extends through openings in the overlapping parts of the two feet 31 and 32, and the sprocket teeth, 34, enter the cleft 33 and drive the link through the pin 16. Each foot 31 and 32 also terminates in a toe 41 and 42 respectively and at the center of each block is a ledge or heel 45 adapted for engagement by the toe 41 at the end of the foot 31 which extends toward it from the next adjacent link. The blocks thus form a series of stops limiting the turning movement of each pair of links about its pivot pin 16, so that while the articulated series of chain links and blocks are free to bend about the two wheels 3 and 4, with each link traveling in an elliptical path, a reverse bending of any pair of links is prevented by the ends of their two overlapping feet 31 and 32, coming into engagement with the respective heels or ledges 45, and the bottom section of chain links forms an inverted arch to carry the weight of the two wheels 3 and 4 on the ground.

In order to reduce wear on the pins 16, each of these is surrounded by a tubular sleeve or bushing 50 to receive the thrust of the sprocket teeth. One end of each sleeve or bushing, which projects beyond the wall of the corresponding block or rail piece 30, is slotted, as indicated at 52, and engages in a correspondingly shaped opening in the wall of the inner link 15, while the pivot pin 16 is flattened at one end to engage in a corespondingly shaped opening in the wall of the outer link 15; so that all turning movement between the sleeve and the inner link, and between the pin and the outer link, respectively, is prevented, and the rubbing friction is taken off of the openings in the link walls and distributed over the pin and the bushing. The outer and inner pairs of walls 21 are spaced apart by thrust washers 55 and the inner walls are separated from the inclosed thrust block 30 by a pair of washers 56.

Figure 4:
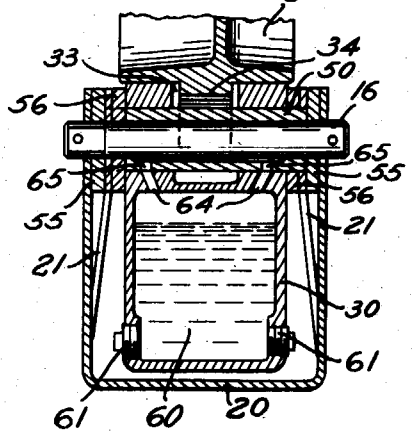
Fig. 4 is a transverse vertical section on the line 4—4 of Fig. 1.
Figure 3:
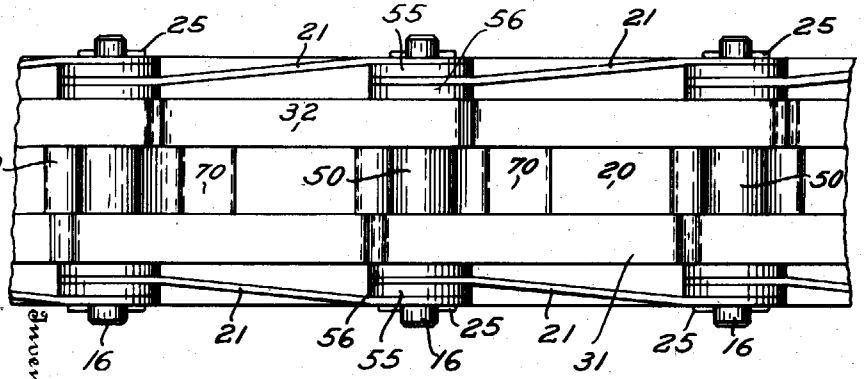
Fig. 3 is a top plan view of a few links in the lower part of the chain.

In order to provide effective lubrication of the pivot joint between each pair of links, the large center or head part of the inclosed block 30 is made hollow, as indicated in Figs. 4 and 6, providing a large oil chamber 60 which is filled through filling openings 61. From this oil chamber the oil escapes through restricted openings 64, and corresponding openings 65 through the bushing 50, to lubricate the pivot pin 16. As the openings 64 are restricted in size, the oil cannot escape freely from the oil chamber even when the openings 64 and 65 correspond and the chamber is inverted, as the oil is confined by atmospheric pressure and can escape only by capillarity, thus providing effective lubrication without any waste of oil. The center or head part of each rail piece 30 is also made with a lip or projection 70, reinforced by a rib 71, to close the opening between each pair of links in the lower forward part of the chain when the machine is moving ahead, as indicated at 72, and prevent dirt and stones from clogging the mechanism. The links may also be fitted with cleats or flanges 75 to afford better traction, the latter being shown considerably wider than the links to provide lateral stability. When the machine is operating in limited space, these can be removed.

It will thus be seen that the overlapping rail pieces 30, articulated together in an endless series directed about the two wheels 3 and 4 on each side, form a folding track or rail, with a smooth, uninterrupted track-way or rail-tread, 76 (Fig. 1), for the wheels to run on; the side walls 21 of each link being recessed, as indicated at 77 (Fig. 1), to clear the rims of the wheels. Since the track-way 76 projects beyond the vertical radii of the respective wheels, in each direction, the wheels will roll along this track-way without jolt or jar, and provide a smooth and efficient operation of the mechanism.

In Fig. 7 is a form of the drive chain in which the links 15 are replaced by flat plates 90 similar to the link plates of an ordinary block chain of common form and without any tread part, in this case the rail pieces 91 traveling directly upon the ground. These latter parts are similar in all respects to the rail pieces 30 except that in place of the tangential extension 70, each rail piece or block is made with two extensions or projections 92 in opposite directions so that when the lower part of the chain is flat upon the ground these projections will nearly meet and form a substantially continuous track to carry the weight of the machine, while their upper edges form a smooth, unbroken track-way 93 for the two wheels to run on.

In Fig. 8 are illustrated fragmentary parts of a pair of rail pieces corresponding to the parts 30 but somewhat modified in form, the extension 79 from one of the pieces having a toe 80 which engages upon a heel 81 upon the other piece in such manner that the thrust comes at right angles to the tangential line through the pivot pin, as indicated by the two crossed lines. The effect of this is to prevent any bending force being imparted through the thrust between the toe and the heel of the engaging parts. As a further and separate improvement, there may also be interposed a resilient pad 82 of rubber, leather, or relatively softer metal between the two parts.

Figure 9:
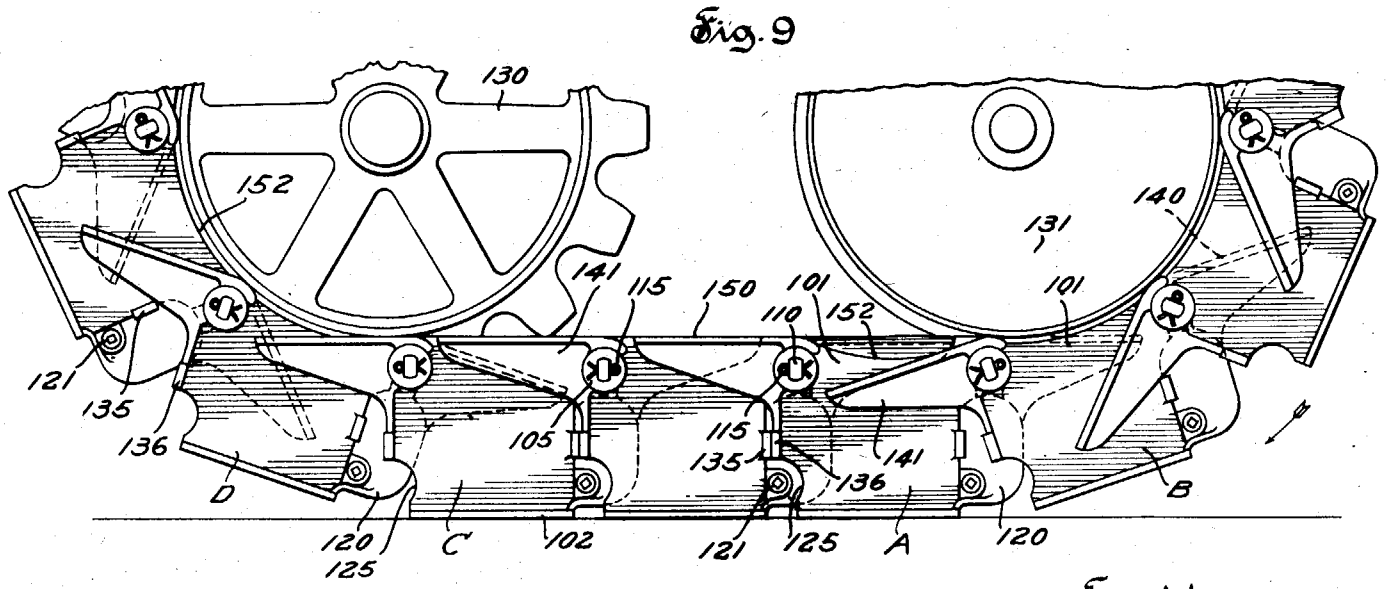
Fig. 9 is a view in side elevation showing a complete drive chain of a further modified form.
Figure 11:
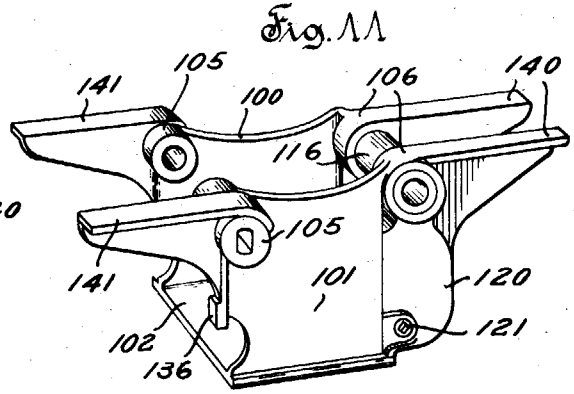
Fig. 11 is a perspective view of one of the links shown in Fig. 10.
Figure 10:
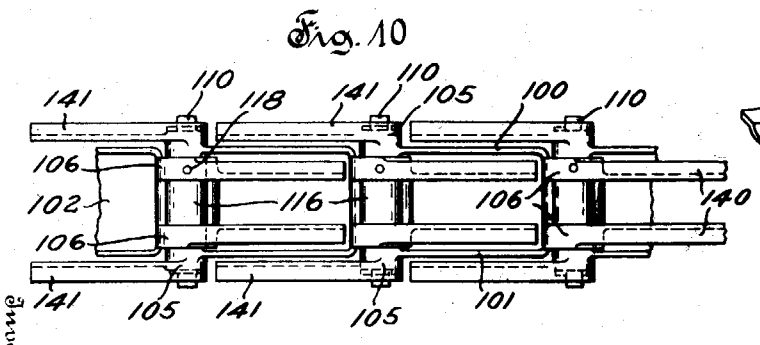
Fig. 10 is a top plan view showing some of the links in the chain shown in Fig. 9.

In Figs. 9 and 10 is illustrated a further modified form of my improved drive chain, in which each link is a box-like structure comprising two vertical, parallel side walls 100, 101 and an integral connecting tread part 102 adapted to rest on the ground in the lower part of the chain travel, as shown in Fig. 9. For the purpose of articulating the links together, each side wall 100 and 101 is made integral with a pair of hubs, 105, at one end of the link and a similar pair of hubs, 106, at the opposite end of the link; the first pair being spaced apart such distance as to embrace the second pair between them, whereby the links may be strung together in an endless series with each pair connected by a pivot pin or bolt 110.

The pivot pins 110 are flattened or squared at one end and engaged in correspondingly shaped openings in the hubs 105 to prevent the pins from rotating, and they are secured in place by split pins 115 at each end; while between the pivot bolts and the openings in the hubs 106 are interposed bushings 116 which are fixed in place by pins or set screws 118 to prevent them from rotating in their hubs, so that all of the rubbing friction in the bending of each pair of links is confined to the surface between the pins and their bushings. To provide for lubrication of these joints each link is made integral with a large oil chamber 120 adapted for filling through a sealed opening 121, with a restricted oil outlet opening to the bushing and thence through the latter to the pivot bolt; the arrangement being similar to that above described for lubrication of the links shown in Figs. 1 to 6. In the straightening out of the chain in the lower and upper parts of its travel the oil chambers 120 telescope between the walls 100 and 101 of the next succeeding links, but the oil-filling openings 121 remain accessible through curved recesses 125 in the edges of these walls.

The chain is directed around a sprocket wheel 130 and an idler wheel 131, and in order to bridge the gap between the wheels and prevent the lower section of chain from bending up between the wheels, there is formed on the closed end of each link a ledge or abutment 135 adapted for engagement against a corresponding part, 136, on the end of the next succeeding link to limit the relative pivotal movement of each pair of links and prevent them from bending in a reverse angle up between the two wheels 130 and 131.

Each link is also made integral with a pair of brackets 140, which extend tangentially from the radially inner edge of its walls 100 and 101 in one direction, and with a similar pair of brackets 141 at its other end extending in the opposite direction; the first pair being so spaced apart as to be embraced between the walls 100 and 101 of the next succeeding link, while the pair of brackets 141 overlaps the walls of the next succeeding link in the opposite direction. The effect of these brackets, in their overlapping relation to the side walls of the links and to each other, is to form a straight unbroken track indicated by the line 150 in Fig. 9, for the two wheels to roll upon; the two walls 100, 101 being cut away on a curved line, indicated at 152, so that the wheels rest directly upon these brackets and each link will support its load as soon as it reaches the ground under the front wheel, and will carry it until it starts to leave the ground over the rear wheel. Thus, assuming a forward movement of the machine in the direction indicated by the upper arrow, the link A lies flat on the ground to support the weight of the wheel 131 and will continue to support such weight until the link B is flat on the ground and ready to assume its burden, thus preventing the violent slapping together of the link which would ensue if the weight were thrown suddenly upon the link B. Likewise the link C at the rear end of the chain receives the weight of the wheel 130 before the link D is started on its upward travel, thus preventing the jerking of the chain which would result from the sudden shifting of the load from one link to another at the rear end of the chain.

When the chains travel about the two wheels the brackets or shelves 140 and 141 project tangentially from their rims and the curved recesses 152 permit the hubs 105 and 106 to engage directly upon the rims of the wheels and the sprocket teeth to mesh with the bushings for driving the chain, while the straightening out of the chain in the lower part of its travel brings all of the brackets or shelves 140 and 141 into line to form the straight unbroken track-way 150.

I claim as my invention:

1. A drive chain for tractors comprising an endless series of hollow links, fastened together by pivots, the pivots also carrying rail pieces, or blocks, within the links.

2. A drive chain for tractors comprising an endless series of hollow links fastened together by pivots, the pivots also carrying rail pieces, or blocks, within the links, each of said rail pieces having a heel and a toe adapted to engage against the heel of the next succeeding rail piece.

3. A drive chain for tractors comprising an endless series of hollow links fastened together by pivots, the pivots also carrying rail pieces, or blocks, within the links, said rail pieces overlapping to form an uninterrupted track-way for a load supporting wheel.

4. A drive chain for tractors comprising an endless series of hollow links fastened together by pivots, the pivots also carrying rail pieces, or blocks, within the links, each of said rail pieces having therein an oil chamber with a restricted outlet opening to the pivot.

5. A traction chain comprising a series of elements of itself preventing bending of said series and also preventing tension stress from being set up in said series when subjected to transverse pressure in one direction, a second series of pivotally united elements for sustaining traction on said chain, and means holding the said two series in association so as to maintain their angular velocities of travel equal.

6. A traction chain comprising a series of elements mutually interlockable to alone prevent bending of said series and also to prevent tension stress from being set up in said series when subjected to transverse pressure in one direction, a second series of pivotally united elements for sustaining traction on said chain, and means holding the said two series in association so as to maintain their angular velocities of travel equal.

7. A traction chain comprising an endless series of pivotally united links, and comprising further a series of blocks associated with said links said blocks mutually interlocking to prevent tension stress from being set up in said series of links by transverse pressure on said chain in one direction, and means connecting said two series so as to maintain their angular velocities of travel equal.

8. A traction chain comprising an endless series of pivotally united links, and comprising further a series of blocks associated with said links said blocks mutually arching to prevent tension stress from being set up in said series of links by transverse pressure on said chain in one direction, and means holding the said two series in association so as to maintain their angular velocities of travel equal.

9. A traction chain comprising a series of links each two consecutive links being pivotally united and further comprising a series of blocks each pivotally mounted on one of the axes of the pivotal unions between the links and the blocks of the series being interlockable to prevent tension stress from being set up in said first series by transverse pressure on said chain in one direction.

10. A traction chain comprising a series of links each two consecutive links being pivotally united and further comprising a series of blocks each pivotally mounted on one of the axes of the pivotal unions between the links and the blocks of the series being interlockable to form an arch to prevent tension stress from being set up in said first series by transverse pressure on said chain in one direction.

11. A traction chain comprising a series of links each two consecutive links being pivotally united and further comprising a series of blocks each pivotally mounted on one of the axes of the pivotal unions between the links and the blocks of the series being interlockable adjacent the said pivotal unions to prevent tension stress from being set up in said first series by transverse pressure on said chain in one direction.

12. A traction chain comprising a series of links each two consecutive links being pivotally united and further comprising a series of blocks each pivotally mounted on one of the axes of the pivotal unions between the links and the blocks of the series being interlockable to prevent tension stress from being set up in said first series by transverse pressure on said chain in one direction, and pads between said blocks at points where interlocking takes place.

13. A drive chain for vehicles comprising a series of elements of which adjacent ones are associated to prevent inward bending, a series of links of which adjacent ones are pivotally connected to sustain tension stresses on the drive chain, the two series coacting so that the series of elements alone limits its inward yielding to transverse upward pressure before the series of links can reach a similar limit.

14. In a device of the class described, a pair of wheels, an endless tread passing over said wheels and comprising a plurality of lapping shoes and a chain joining said shoes, the connecting elements between the chain sections providing pivotal mountings for the shoes, said shoes forming lapping tracks for the wheels and designed to co-operate with the chain sections to prevent the shoes from tilting under the weight of the wheels.

15. In a truck a pair of supporting wheels, a tread, passing over said wheels, including a chain and shoes pivotally carried at the joints between the chain links, said shoes having lapping tracks for said wheels and adapted to co-act with the chain links to prevent the tipping of the shoes by the weight of the wheels thereon.

16. In a truck a pair of supporting wheels, a tread passing over said wheels, including a chain and shoes pivotally carried at the joints between the links of said chain, each shoe having a wheel supporting track reaching in opposite directions on either side of its pivot substantially to the pivots of the next adjacent shoes and a stop near each end of each shoe, arranged to co-act with the chain to prevent the tipping of the shoes under the weight of the supporting wheels.

17. In a device of the class described, a pair of wheels, an endless tread passing over said wheels and comprising a plurality of lapping shoes and a chain joining said shoes, the connecting elements between the chain sections providing pivotal mountings for the shoes, said shoes forming lapping tracks for the wheels.

18. In a truck a pair of supporting wheels, a tread, passing over said wheels, including a chain and shoes pivotally carried at the joints between the chain links, said shoes having lapping tracks for said wheels.

HUGO F. SCHMIDT.